Figure 1:
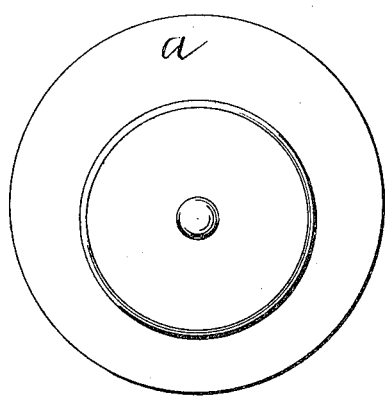

C. J. ENEBUSKE.
COMPOUND OF IODIN AND TANNIN.
APPLICATION FILED SEPT. 11, 1909.

993,295.

Patented May 23, 1911.

Witnesses:
Veronica M. Braun
Lester M. Halloran

Claës J. Enebuske, Inventor
by Schreiter & Mathews
his Atty's

UNITED STATES PATENT OFFICE.

CLAËS JULIUS ENEBUSKE, OF NEW YORK, N. Y.

COMPOUND OF IODIN AND TANNIN.

993,295.      Specification of Letters Patent.      Patented May 23, 1911.

Application filed September 11, 1909. Serial No. 517,271.

*To all whom it may concern:*

Be it known that I, CLAËS J. ENEBUSKE, a citizen of the United States, and a resident of the city, county, and State of New York, have invented a certain new and useful Chemical Composition of Iodin with Tannin and a Process of Manufacturing the Same, of which composition and of the process of its manufacture the following is a full, clear, and exact specification.

I have found that the inherent tendency of iodin to combine with the protein substances of the blood may be utilized to produce a very effective, mainly vaso-tonic eutrophic action, normalizing arterial tension. The vaso-tonic regulator action of iodin is particularly strongly marked in the incipient stages of certain diseases of the arthritic group, characterized by arterial hypertension. In these diseases the action of iodin as such manifests itself by prompt reduction of the blood-pressure, reducing it rapidly to normal, recording one hundred fifty millimeters on the clinical sphygmometer. Simultaneously, amelioration of all associated symptoms is observed. In the diseases of the lymphatic group, the eutrophic action of iodin is associated with vaso-tonic regulator action, manifesting itself by a gradual rise of the blood-pressure to one hundred fifty millimeters, when it has been abnormally low, one hundred ten millimeters, or lower. When the arterial pressure is normal, the introduction of iodin into the blood vessels does not affect it. To do so, it is necessary to produce a chemical combination of iodin that will permit its being conveyed into the blood-vessels, and from which it will be liberated by its inherent tendency, to combine with the protein substances of the blood, and in devising such an iodin composition, intended for such purposes, regard must be had also, in the selection of the substances, wherewith the iodin is combined, in respect to their ultimate disposition after the iodin is freed from its union with them.

The object of my invention is to produce such a composition of iodin, responding to these requirements, and to attain the stated object of my invention, I have devised the hereinafter explained chemical combination of iodin with tannin, glycerin being employed to bring them to a state in which they combine with each other chemically, and, being hygroscopic, prevents the formation of hydriodic acid by holding the water against the tendency of iodin to combine with it. Sugar and water are added to keep the composition in a chemically constant condition, and they serve, incidentally, also as a vehicle for internally administering it. The directly effective element of the composition is the iodin, the other ingredients having only the function of producing its temporary chemical combination to enable it being conveyed into the blood-vessels, by internal administration of medicines of which the composition is an ingredient. Incidentally the tannin element, chemically binding the iodin, serves also to assist the passage of the iodin, thus combined, to the blood-vessels, the locus of its therapeutic action, through the mucous membranes, allaying and neutralizing its irritating action thereon.

The chemical iodin composition may be prepared as follows:—First, eight parts of tannin and forty parts of glycerin, measured by weight, are put together and shaken until a clear solution of the tannin in the glycerin is obtained. During this mixing process the tannin and glycerin must be maintained steadily at a temperature of approximately 150° F. The tannin and glycerin solution is then filtered, and, considering the solution as constituting forty-eight parts, a portion equal to forty-five parts of it is filled into a bottle, and two parts of iodin, finely powdered and perfectly dry, are added thereto, the bottle corked, and the cork firmly secured by a clamp or cord. The bottle should be made of strong glass, and the cork or stopper used for this purpose should be of the best quality and paraffined. The contents of the bottle must be agitated for about twenty-four hours, and during this period of the process kept at a temperature of from fifty-five to sixty-five degrees Fahrenheit. This may be done by rotating the bottle in fresh or salt water, maintained at the stated temperature, at a speed of from twenty to thirty revolutions per minute, and it is advisable to frequently alternate the direction of its rotation. An apparatus suitable for carrying on this part of the process is shown in the accompanying drawings, wherein—

Figure 2:
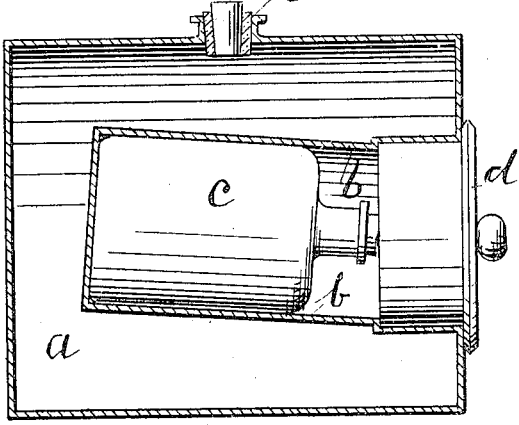
Figure 3:
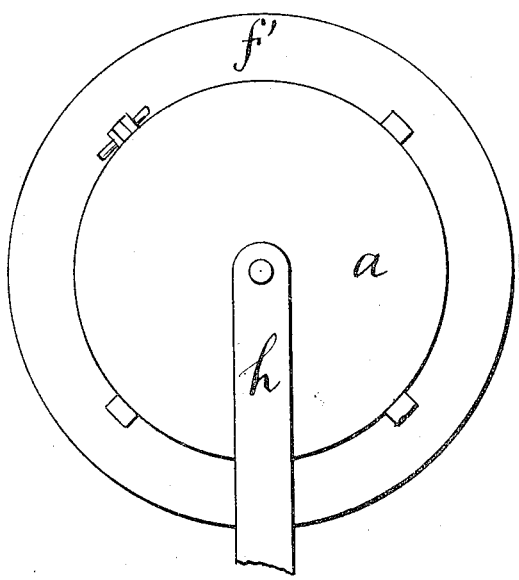
Figure 4:
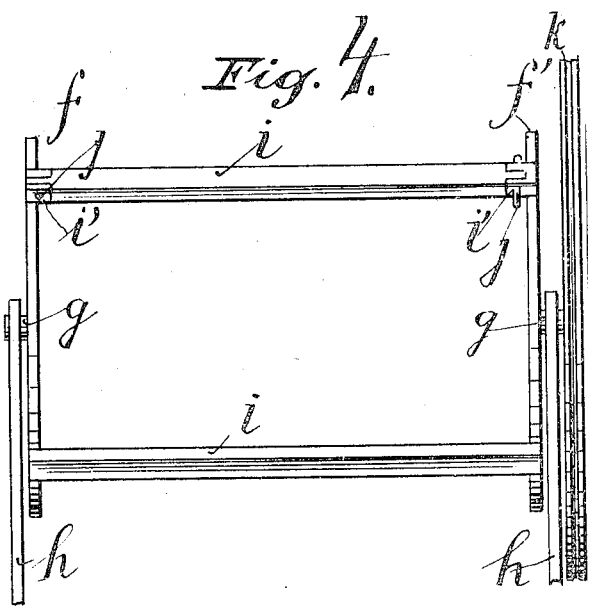

Figure 1 is a front elevation of the cooling jacket; Fig. 2 a longitudinal sectional view of it; Fig. 3 a front elevation of the rotary frame, and Fig. 4 a longitudinal sectional view thereof.

Referring to these drawings, a designates a jacket, preferably made of galvanized sheet metal, and wherein the receptacle b for the bottle c is eccentrically set. It will be noted with reference to Fig. 2, that the receptacle b is not only eccentrically set in the jacket a, but also at an angle to its axis; the object of this is to produce a motion agitating the whole of the contents of the bottle and also the rotation of the liquid (fresh or salt water) filled in the jacket a around the receptacle b, when the jacket is rotated. Lid d is snugly fitted in the enlarged portion of the receptacle b, and closes it airtight. For the same reason the capacity of the bottle c should be larger than the aggregate volume of the ingredients to be treated therein; the further object of that being to facilitate the keeping of the whole of its contents at the requisite temperature. The opening e in the jacket a, closed by stopper e', serves for filling jacket a with the cooling water or salt solution, and the stopper e is preferably perforated to enable a thermometer to be inserted therein, for indicating the temperature of the cooling water or solution.

The frame for the jacket (Figs. 3 and 4), consists of disks f and f', having concentrical trunnions g set in uprights h. The disks are joined together by tie-bars i connected to the disks by clamps or dove-tailed joints i' held together by pins j. On one of the trunnions g a rope pulley k is set for imparting to the frame such oscillating rotary motion. This apparatus is well suitable for use in preparing the compound; its use, however, is not essential. Its construction may be varied or changed, or another apparatus, equally or better suitable for otherwise producing the oscillating rotary motion of the contents of the bottle and of the liquid in the cooling jacket a around the receptacle b, may be devised.

Such treatment of the tannin and glycerin and iodin mixture if steadily continued for about twenty-four hours, should result in chemically combining the iodin with the tannin. To determine whether all iodin is combined chemically, the bottle is set up and left standing still for about twelve hours. If no sediment accumulates on the bottom, the process is completed, and if this result should not be obtained in the time stated, (24 hours) the remainder of the tannin and glycerin solution is added and the agitating of the contents of the bottle should be continued until all of the iodin is thus chemically bound. It is not a defect if a part, not exceeding one-twentieth part of the iodin remains uncombined, but it is preferable to keep on with the process until all of the iodin is chemically combined. This finishes the process of chemically binding the iodin as required for the stated purpose.

To add to the chemical stability of the composition, that is, to hold the iodin and tannin in constant chemical combination, and to provide a vehicle for its more convenient and agreeable administration internally, a solution of sugar, in distilled water, is added thereto. This is done as follows: Thirty parts of sugar (determined by weight) are dissolved in twenty parts of water, by boiling, and then one-fifth of the resulting solution are added to the tannin and glycerin and iodin combination, together with remainder of the tannin and glycerin solution, and the agitating continued for about half an hour longer. Then the remainder of the sugar and water solution are added thereto, and the mixture again agitated, for about fifteen to thirty minutes, to effect a complete, intimate mixing of the ingredients, and to assimilate this addition, which though serving merely as a diluent, adds to the margin of safety for holding the iodin in a chemically bound state as explained, and standardizes the compound to one holding two per cent. of iodin chemically bound in solution. The sugar of the solution helps, as explained, to hold the iodin and tannin in chemical combination, and is digested; and so is the water, used to produce the sugar solution. Neither the sugar nor the water has, however, any other purpose, and other substances may be used in their places without in any manner affecting or changing the stated properties and functions of the iodin, tannin and glycerin composition.

Assuming that the commonly accepted formula for tannic acid does correctly express its chemical structure, my iodin composition may be designated as "hydro-diiododigallic acid" and its chemical structure stated as $C_{13}H_9I_2O_7COOH$. The chain of elements of this composition is theoretically expressed as follows:

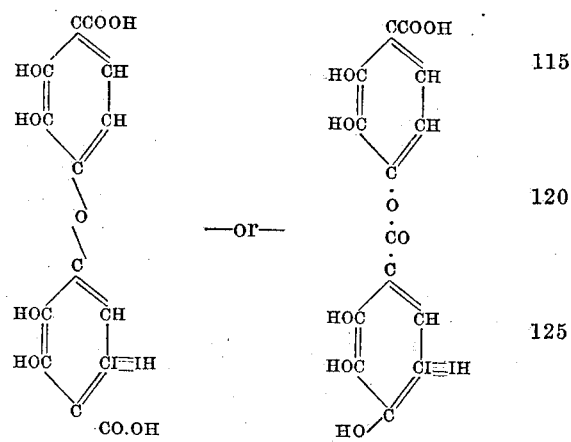

This shows that this iodin composition differs in its chemical structure from all iodin compositions heretofore known, in that in it the iodin is placed as intra-radicular iodin, replacing hydrogen and forming a sidechain in the tannic acid molecule, retaining the required mobility to free itself and combine with the albuminoids of the blood, when the composition is introduced into the blood vessels of the body. Yet the chemical union of the iodin in the composition is of sufficient stability to carry it, by the tannic acid molecule, through the channel of absorption into the blood. Thus the object of my invention is attained. This object is, as explained, to combine iodin with such substances as will assist in conveying it into the blood vessels, and so that while its combination with these auxiliary substances is sufficiently stable to keep the iodin bound during the transmission, it does not prevent it from being set free when brought into contact with the protein substances of the blood. The iodin is then disengaged from its chemical union in the composition in the presence of albumen, and then, acting transitorily as elementary iodin, forms iodo-albumen, while the restituted tannin molecule forms albumen-tannate, subsequently dissociated in the presence of water into two molecules of albumen-gallate.

The iodin when freed from its union in the composition, enters directly into combination with the protein substances of the blood and thereby produces its action upon the tissue elements. Its action differs from the biochemical action of the various preparations, containing free iodin dissolved in iodid, in hydriodic acid, or in alcohol, from the actions of the various preparations of iodin and tannin heretofore used in therapeutics, including the iodized tannin syrup prepared in accordance with the process of Cocquet and Guilliermond ("*Sur une nouvelle combinaison de l'iode*," *Journ. de Pharm. et de Chimie*, 3 serie, t. xxiv, 1854;) from the action of preparations made by combining iodin and starch, iodin and albumen, and from the actions of preparations containing iodin dissolved in oil.

My iodin composition does not contain iodid or free hydriodic acid, except a trace of it, may be, and the iodin is not engaged as halogenous iodin at the negative pole of the combination. All iodin, contained therein, is engaged in an intra-radicular combination, in the central ring, substituting hydrogen, or in a side-chain, or both. The iodin composition, made according to my invention, when prepared and then properly manipulated in accordance with chemical laws, is sufficiently stable for preservation and administration, but to guard against the use of improperly prepared or of deteriorated composition, prepared according to my invention, it is absolutely necessary, that it should be assayed with scientific precision before its employment for medical use, because even when correctly produced, the composition may deteriorate under the influence of incorrect preservation or admixture of incompatible chemical substances. Such deterioration is associated with the breaking up of the side-chain of the radical containing the iodin, the transient liberation of iodin and its transformation into hydriodic acid. It may, even when correctly produced, contain a "trace" of hydriodic acid. This, however, does not interfere with its chemical or physiological characteristics or effects, unless the quantity (proportion) of hydriodic acid is excessive. If the iodin composition is found to contain more than a trace of hydriodic acid, the fact would indicate, that the composition was not correctly produced. In such a case, all or nearly all of the iodin may have been transformed into hydriodic acid, and such a composition does not possess the chemical and physiological characteristics of my iodin combination and would not produce the stated pharmaco-dynamic action.

The identity of my iodin composition may be determined, and the composition distinguished from hydriodic acid or iodids and from other similar substances by the following test: Dilute twenty-five cubic centimeters of the preparation with fifty cubic centimeters distilled water. Add from a burette three and five-tenths cubic centimeters of one-tenth normal silver nitrate solution. Mix gently without violent stirring. If the composition tested was made as herein set forth, it is free from hydriodic acid, and a yellowish-bluish opalescence is observed in the liquid, which remains limpid, translucid, and in a thinner layer transparent. Even after one hour there is no opacity. After twenty-four hours there is slight opacity, but no precipitate; the liquid remains translucent. If an equivalent amount of hydriodic acid or iodid is manipulated in exactly similar manner, the liquid, on the admixture of the silver nitrate, appears instantly, or in less than an hour, of yellowish-milkish color, non-translucid; precipitate soon begins to be deposited, and in less than twenty-four hours the bottom of the beaker is covered with yellow precipitate of iodid of silver.

The iodin composition, obtained by the process herein described, is a dark brown, limpid liquid, in which the acting substance is dissolved. The biochemic and pharmacodynamic action is due to iodin as explained. The tannic acid is accessory, but important,—(*a*) It acts as carrier of iodin as already stated. (*b*) It deprives the iodin of its irritating property and facilitates its absorption. (*c*) It forms albumen-tannate in the tissues subsequently dissociated in the presence of water into two molecules of albumen-gallate.

The tannin and glycerin are disposed of and ultimately eliminated from the body, the tannin being supposed to be converted into gallic acid and passed out through the kidneys and the glycerin being probably carried by the blood into the tissues and there digested.

This chemical combination of iodin, prepared as set forth herein, was devised by me as the result of extended tests and experiments, and while it is probably possible to modify or vary the proportions and the method of combining its essential ingredients, and while probably other chemical substances may be found as substitutes for one or the other, or all, of the accessory ingredients of the composition, the composition prepared of the stated ingredients in the manner herein described has demonstrated, in extended experimental applications, that it produces the stated effects of iodin upon the arterial conditions. These experiments showed that the stated effects are obtained by surprisingly small doses of the composition; the administration of from two to nine centigrams in twenty-four hours being found sufficient to produce them, the symptoms of its action manifesting themselves often in a few hours after the administration of such dose and always by continuing the administration for a few days.

It must of course be understood, that the use of this composition must be confined to prescriptions of medical practitioners, capable to determine when, or in what cases, its use is advisable, and when not; also in what doses and in what manner it is to be administered in each individual case. As far as I was able to determine, it should not be used in cases of valvular heart-diseases, ventricular hypertrophy in marked degree, arterial hypo-tension in marked degree (when due to heart-disease), passive congestion, edema, nor in a case of albuminuria (unless the patient is thus affected only in a slight degree or intermittently), in cases of fever, acute or subacute stages, and in no case should a dose in excess of nine centigrams three times in twenty-four hours be administered to a male adult. Correspondingly smaller doses must be allowed for women and children.

For pharmacal purposes the iodin composition, produced according to my invention, is modified in two principal ways: (a) by dilution; (b) by exsiccation. By the former process it is made into a syrup. By the latter process it may be formed to granules, tablets or lozenges, each containing a definite quantity of iodin, in a state rendering it feasible and convenient for internal administration.

I claim as my invention:

1. A composition of iodin and tannin, whose chemical formula is $C_{13}H_9I_2O_7COOH$ and which produces no precipitate of iodid of silver within twelve hours when gently mixed with 3.5 cc. of one-tenth normal solution of silver nitrate solution to each 25 cc. of the composition, diluted with double quantity of distilled water and then left standing.

2. The process of producing a chemical combination of iodin with tannin, consisting of the following steps: (1) dissolving the tannin in glycerin with the aid of heat; (2) adding the iodin to the tannin and glycerin solution, cooling the composition to from 50° to 65° F., keeping it at this temperature and agitating it until all of the iodin is chemically combined as herein set forth.

3. The process of producing a chemical combination of iodin with tannin, consisting of the following steps: (1) placing the tannin into glycerin, heating the mixture to approximately 150° F. and shaking it, while maintained in such heated state, until all of the tannin is dissolved; (2) adding the iodin to the tannin and glycerin solution, cooling the composition to from 55° to 65° F., keeping it at this temperature and agitating it until all of the iodin is chemically combined as herein set forth.

CLAËS JULIUS ENEBUSKE.

Witnesses:
AXEL JOSEPHSON,
ROBERT A. PIPER.